US009446848B2

(12) United States Patent
Jerome et al.

(10) Patent No.: US 9,446,848 B2
(45) Date of Patent: Sep. 20, 2016

(54) ARRANGEMENT OF SEATS CONVERTIBLE INTO BUNKS

(71) Applicant: STELIA AEROSPACE, Rochefort (FR)

(72) Inventors: Olivier Jerome, Vaux sur Mer (FR); Laurent Texeraud, Clavette (FR); Gabriel Martin, Echillais (FR)

(73) Assignee: STELIA AEROSPACE, Rochefort (FR)

( * ) Notice: Subject to any disclaimer, the term of this patent is extended or adjusted under 35 U.S.C. 154(b) by 0 days.

(21) Appl. No.: 14/223,723

(22) Filed: Mar. 24, 2014

(65) Prior Publication Data
US 2014/0283296 A1 Sep. 25, 2014

(30) Foreign Application Priority Data

Mar. 25, 2013 (FR) ...................................... 13 52623

(51) Int. Cl.
*B64D 11/06* (2006.01)
*B60N 2/34* (2006.01)
*B60N 2/01* (2006.01)

(52) U.S. Cl.
CPC ............ *B64D 11/0601* (2014.12); *B60N 2/01* (2013.01); *B60N 2/34* (2013.01); *B64D 11/0604* (2014.12); *B64D 11/0605* (2014.12); *B64D 11/0606* (2014.12); *B64D 11/0641* (2014.12); *B64D 11/0646* (2014.12)

(58) Field of Classification Search
CPC ............. B64D 11/601; B64D 11/604; B64D 11/0646; B60N 2/01; B60N 2/34
See application file for complete search history.

(56) References Cited

U.S. PATENT DOCUMENTS

| 2,124,003 | A | 7/1938 | McDonnell, Jr. et al. |
| 7,419,214 | B2 * | 9/2008 | Plant ............................. 297/245 |
| 7,703,718 | B2 * | 4/2010 | Saint-Jalmes et al. ..... 244/118.6 |
| 8,118,365 | B2 * | 2/2012 | Henshaw ...................... 297/245 |
| 2007/0040434 | A1 * | 2/2007 | Plant ......................... 297/354.13 |
| 2007/0152100 | A1 | 7/2007 | Saint-James et al. |
| 2009/0243358 | A1 * | 10/2009 | Henshaw ...................... 297/340 |
| 2010/0052382 | A1 * | 3/2010 | Dryburgh ..................... 297/232 |
| 2012/0223186 | A1 * | 9/2012 | Henshaw ................... 244/118.6 |
| 2012/0223557 | A1 * | 9/2012 | Henshaw ...................... 297/232 |
| 2012/0292957 | A1 * | 11/2012 | Vergnaud et al. ....... 297/188.08 |
| 2012/0298798 | A1 * | 11/2012 | Henshaw et al. .......... 244/118.6 |

(Continued)

FOREIGN PATENT DOCUMENTS

| EP | 2507131 | 10/2012 |
| WO | 2009120308 | 10/2009 |
| WO | 2011067286 | 6/2011 |
| WO | WO 2015061688 A2 * | 4/2015 | ......... B64D 11/0646 |

*Primary Examiner* — Joseph W Sanderson
(74) *Attorney, Agent, or Firm* — Perman & Green, LLP (57) ABSTRACT

A set includes two blocks each of two seats convertible for lying down, wherein the two blocks are arranged with the seats of one block face-to-face with the seats of the other block inside a circumscribed rectangle. Each block includes a first seat and a second seat. The first-seats of the two blocks are arranged along a first diagonal of the circumscribed rectangle and the longitudinal axes of the first seats are oriented so that their directions are close to the first diagonal and the first seats are substantially face-to-face. The distance between the two first seats is such that a foot area of a first seat of a block is superposed when seen from above with a foot area of the first seat of the other block. In the recumbent configuration, the planes to lie down on of the two first seats are at different heights.

13 Claims, 6 Drawing Sheets

(56) References Cited

U.S. PATENT DOCUMENTS

| | | | |
|---|---|---|---|
| 2013/0032668 A1* | 2/2013 | Foucher et al. | 244/118.6 |
| 2013/0248655 A1* | 9/2013 | Kroll et al. | 244/118.6 |
| 2014/0283296 A1* | 9/2014 | Jerome et al. | 5/12.1 |
| 2015/0166182 A1* | 6/2015 | Ducreux et al. | 244/118.6 |
| 2015/0336674 A1* | 11/2015 | Foucher | B64D 11/06 244/118.6 |

* cited by examiner

ARRANGEMENT OF SEATS CONVERTIBLE INTO BUNKS

CROSS-REFERENCE TO RELATED APPLICATIONS

This application claims priority to and the benefit of French Patent Application No. 1352623 filed on 25 Mar. 2013, the disclosure of which is incorporated by reference herein in its entirety.

BACKGROUND

1. Field

The field of the presently disclosed embodiment is that of passenger vehicle cabin layouts.

The aspects of the disclosed embodiment more particularly concerns an arrangement of seats convertible into bunks particularly suited to the requirements of passenger cabins, for example aircraft cabins.

2. Brief Description of Related Developments

In the transport field, for example in the air transport field, it is known to arrange seats in successive rows placed alongside one another which are accessed via aisles in the direction transverse to the rows.

For economic reasons an attempt is made to place the maximum number of passengers in a given space and, as well as modifying the width of the seats, this entails reducing the distance between two rows of seats as much as possible.

The consequence of this is a reduction in comfort that makes long journeys uncomfortable and is moreover unacceptable for certain classes of passengers.

If the journey time justifies it, for example in the case of long-haul flights, it is known to offer passengers seats that can be converted between sitting, reclining and recumbent positions during the journey.

For this purpose it is known to produce seats where conjugate movements of the seat cushion, the seat back and a leg support to position these various parts of the seat substantially horizontal and in the same plane make it possible to form a surface to lie down on, where appropriate extended by a fixed footstool at the same height as the plane to lie down on.

However, to enable a passenger to stretch out despite the presence of other seats that can also assume the recumbent position, such seats require more room than non-convertible seats.

In order to limit the penalty of such convertible seats in terms of the distance between two rows of seats, it is known from European patent 2 507 131 to arrange seats 301, 302 in pairs 300 with convergent axes so that the feet of recumbent passengers are between the seat backs of the seats located in front of the pair of seats in question and, in order to limit the necessary distance between the seat backs, to produce planes to lie down on of two adjacent seats of a row at different heights so that the feet of two passengers on them are located in stacked footwells.

Figure 1:
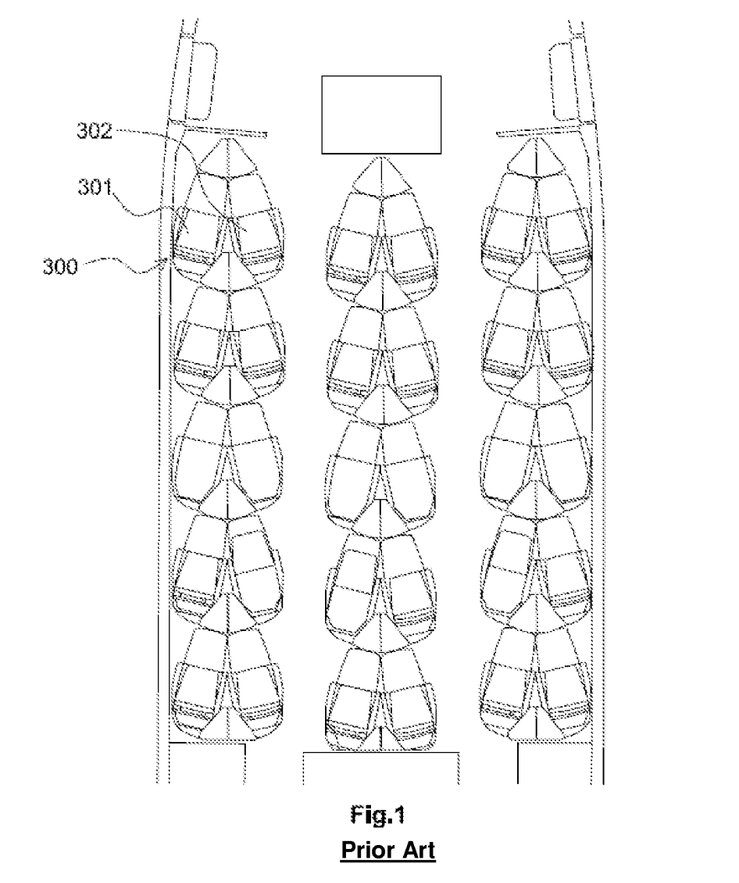
FIG. 1: an example of a layout plan of an aircraft cabin including seats convertible into bunks in accordance with a known solution.

FIG. 1 shows one example of an aircraft cabin arrangement resulting from this solution.

This type of arrangement, which represents significant progress in terms of reducing the pitch of the seat rows in the case of high-comfort seats, nevertheless has limitations, in particular in terms of the arrangement of passengers' personal spaces, and this can make this solution less interesting for some passengers.

SUMMARY

The presently disclosed embodiment proposes an alternative to this known type of arrangement that improves the quality of the facilities offered to passengers, reducing the average pitch of the seat rows without affecting the comfort of the occupants.

The seats are arranged in groups of four seats in a set of two blocks each of two seats, each block comprising a first seat and a second seat, where each seat is individually convertible by relative movement of at least a seat cushion and a seat back of the seat between a sitting configuration and a recumbent configuration. In the recumbent position, the seat cushion and the seat back of a seat are placed substantially in a horizontal plane to form a portion of the plane to lie down on. The two blocks of a set are arranged with the seats of a front block in a globally face-to-face position relative to the seats of a rear block within a rectangle on the floor circumscribing the set, which rectangle is delimited by lateral edges each of length Lx oriented in a longitudinal direction X of the set and by a front edge and a rear edge each of length Ly oriented in a transverse direction of the set perpendicular to the longitudinal direction X.

Furthermore, in the set of two blocks:
the first seats of the two blocks are arranged in the set of two blocks along a first diagonal of the circumscribed rectangle;
longitudinal axes of the first seats are in a direction close to the direction of the first diagonal;
the first seats are placed substantially face-to-face, i.e. an occupant seated on one of the first seats faces an occupant seated on the other first seat.

There is thus obtained an arrangement of the set of two blocks in which the two first seats are able to share an elongate volume between two first seats along a diagonal of the rectangle circumscribed on the set of two blocks.

In one aspect, the distance between the two first seats is such that a foot area of a first seat of a block on which are placed the feet of an occupant of the first seat in question in the recumbent position is superposed when seen from above with a foot area of the first seat of the other block and, when the two first seats are in the recumbent configuration, the planes to lie down on of the two first seats are at different heights relative to a reference level.

Accordingly, for the first seats of the two blocks, in the area of the feet the volumes assigned to one block are superposed on the volumes assigned to the other block. With no significant penalty, this configuration allows a relatively large overlap of the assigned spaces under conditions that are less constraining than if the overlap is produced between a foot area of one seat and a head area of another seat, as is known from the prior art solutions.

In one aspect the length Ly of the front edge and the rear edge corresponding to the width of the circumscribed rectangle is determined by the side-by-side assembly of the two seats of a block, cumulative widths of the seat cushions and armrests of the two seats, and the second seats are arranged in the set along the second diagonal of the circumscribed rectangle and with a longitudinal axis of each of these second seats oriented so that a foot area of each of the second seats is located inside the circumscribed rectangle.

Thus a limited width of the set of two blocks is obtained by virtue of the orientations of the seats of each block.

In one aspect, the foot areas correspond to footwells in which the occupants of the seats can place their feet when the seats are in the recumbent position, arranged in a central console between the two blocks, the footwells of the first seats being superposed, and the footwells of the second seats are juxtaposed from either side of the footwells of the first seats.

In this configuration, without it being necessary to increase the width of the circumscribed rectangle, comfortable footwells are obtained with a width close to that of the seat cushions of the seats.

For technical and aesthetic reasons, each seat is enclosed in a shell that envelops the back of the seat and at least partly envelops the seat laterally.

In one aspect, the rear face of the shell of the second seat of the front block is substantially against the front edge of the circumscribed rectangle, the rear face of the shell of the second seat of the rear block is substantially against the rear edge of the circumscribed rectangle, and the rear face of the shell of each of the first seats is offset a distance DLx toward the interior of the circumscribed rectangle relative to the front or rear edges of said circumscribed rectangle.

This exploits the available length along the diagonal of the circumscribed rectangle to arrange the first seats at a smaller distance in the longitudinal direction X and to make it possible to optimize the combination of a plurality of juxtaposed sets of blocks.

In one aspect, the central console forms a visual separation between the two blocks incorporating individual comfort or entertainment features for the attention of each of the occupants of the seats.

In one particular aspect, the plane to lie down on of at least one of the second seats is offset in height relative to the plane to lie down on of the first seat next to it in the block including the first seat in question.

In this case, the height offset is not constrained by the necessity to superpose footwells and makes it possible to move the two planes to lie down on of the two seats of the same block closer together or farther apart, depending on the required result, achieving an additional degree of freedom in terms of the arrangements of the central column.

In one particular aspect, the plane to lie down on of each of the two second seats is offset in height relative to the plane to lie down on of the first seat that is next to it in the same block, so that two seats in the recumbent position located beside the same lateral edge of the circumscribed rectangle are offset in height in the same direction, upward or downward, relative to the two seats located beside the other lateral edge of said circumscribed rectangle.

This results in two low planes to lie down on on one lateral side of the set and two high planes to lie down on on the other lateral side, and this configuration enables easier access to the various seats in the recumbent position when access is from the lateral side on which the low planes to lie down on are located.

The aspects of the presently disclosed embodiment are also directed to a passenger vehicle cabin or cabin portion including at least one row of at least two sets in accordance with the disclosed embodiment juxtaposed along the longitudinal axis X, in which row a rear face of a rear block of a first set is against a rear face of a front block of a second set juxtaposed to said first set behind said first set.

When the first seats of a set are offset toward the inside of the circumscribed rectangle, the circumscribed rectangles of the at least two juxtaposed sets advantageously overlap partially by the length DLx so that N (N≥2) juxtaposed sets of length Lx occupy in the longitudinal direction X a total length N times Lx minus N−1 times DLx.

This achieves a saving in terms of the cabin length needed to arrange the sets of two blocks and results in a shorter average pitch of the seat rows.

When the cabin includes one or more circulation aisles, the two seats located beside the same lateral edge of the circumscribed rectangle and the planes to lie down on of which are offset downward relative to the two seats located beside the other lateral edge of the circumscribed rectangle are advantageously flanked by a circulation aisle of the cabin or cabin portion.

In one aspect, each a set includes a front block of two seats, a rear block of two seats and a central console forming separate elements that are fixed at required separation distances independently of each other to the floor of said cabin or cabin portion by fixing points arranged in the floor, for example on fixing rails incorporated in the floor.

Thus it is possible to install the various separate elements in a unitary manner when installing a cabin layout and in a subsidiary way to adjust the separating distances between the various elements for particular conditions of use, in particular to adapt a set to different recumbent lengths.

In one aspect of the cabin, a rear block of a first set placed back-to-back against a front block of a second set juxtaposed to the first set of blocks behind the first set of blocks shares ancillaries useful to the functioning of the seats of the blocks in question.

This achieves simpler preparation of the cabin, for example in terms of connection interfaces and common ancillaries.

The cabin or cabin portion is for example an aircraft cabin or cabin portion, where the disclosed embodiment makes it possible, with increased density, to lie down with a level of comfort suited to long-haul flights.

The cabin or cabin portion may equally be a cabin of a terrestrial or maritime vehicle, in particular if, in view of the service offered, the journey time does not justify separate passenger cabins.

BRIEF DESCRIPTION OF THE DRAWINGS

The description of one nonlimiting embodiment of the disclosed embodiment is given with reference to the figures, which represent diagrammatically.

DETAILED DESCRIPTION

The presently disclosed embodiment concerns an arrangement of seats convertible at least between a sitting position, in which an occupant of the seat is seated, and a lying flat position, in which an occupant of the seat is stretched out substantially flat and substantially horizontally.

The aspects of the disclosed embodiment more particularly concerns a set in which our seats are arranged in two blocks each of two seats.

For the requirements of the description there will be considered a forward direction shown in the drawings by an arrow oriented along a longitudinal axis X of the set. This choice of a positive direction of the longitudinal axis X toward the front is arbitrary and will therefore not be considered as restricting the disclosed embodiment.

Nevertheless, unless otherwise demonstrated, the front and the back of a seat must be interpreted relative to the direction in which an occupant of the seat is facing.

It should be noted that the axis of the seats in vehicles is most often oriented as a function of the axis of movement, the seats being oriented either to face forward or to face backward, forward and backward naturally being defined here relative to the direction of movement corresponding to the positive direction of the longitudinal axis X. This orientation configuration is not systematic, however, and a seat can have other orientations relative to the direction of movement.

Figure 2:
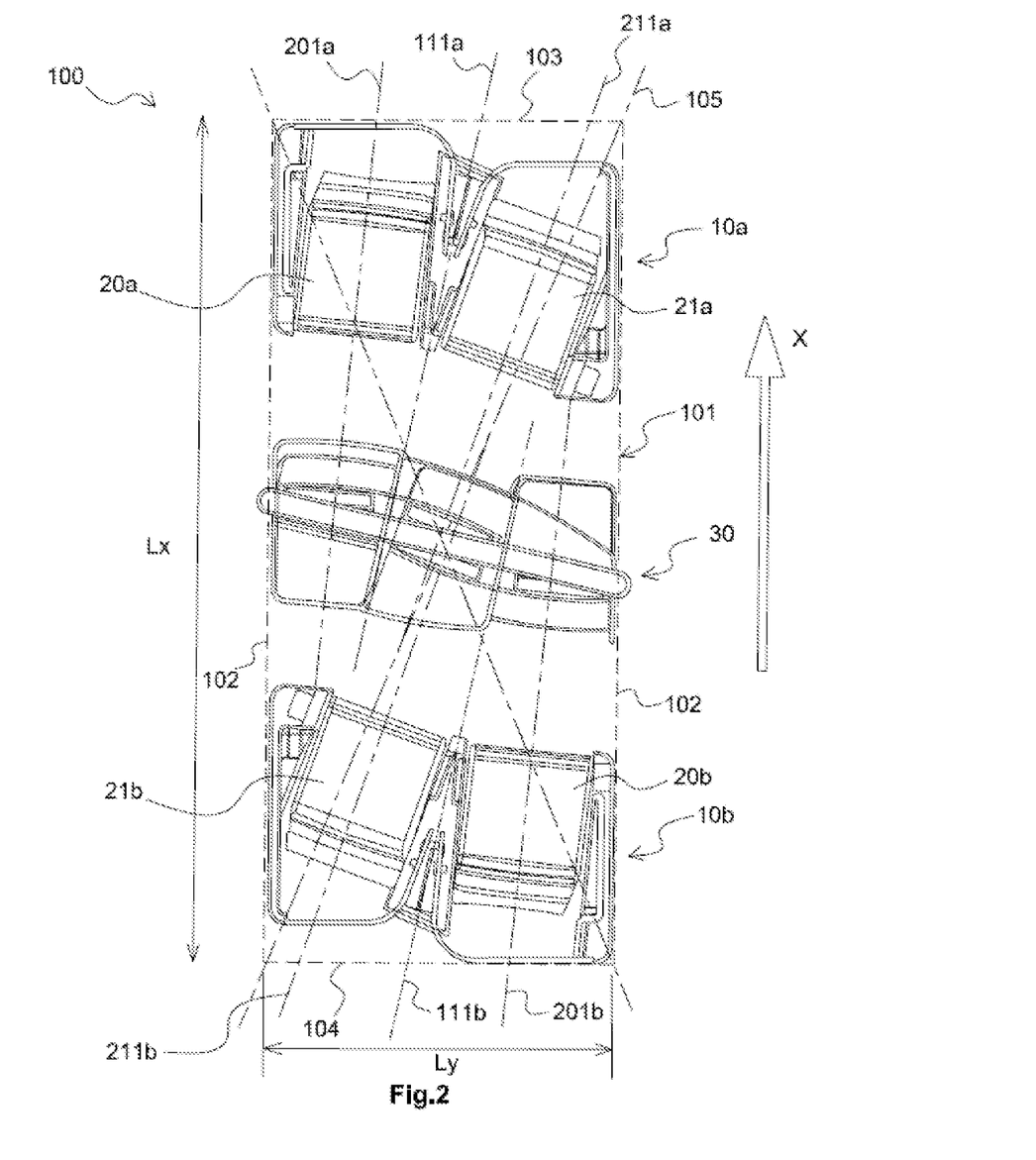
FIG. 2: in plan view, a set of two blocks each of two seats in accordance with the aspects of the disclosed embodiment, placed face-to-face and separated by a central console and shown in a sitting position.

FIG. 2 shows, in plan view, a set 100 of four seats arranged as a front block 10a including a first front seat 21a and a second front seat 20a arranged side-by-side and a rear block 10b including a first rear seat 21b and a second rear seat 20b arranged side-by-side.

In this case the four seats are of very similar shapes and sizes, if not identical, said four seats belonging to a set offering consistent comfort In plan view, in FIG. 2, the set 100 is arranged inside a circumscribed rectangle 101. The circumscribed rectangle includes lateral edges 102 of length Lx parallel to the longitudinal direction X, corresponding to the length of the set, and a front edge 103 and a rear edge 104 of length Ly parallel to a transverse direction perpendicular to the longitudinal axis X, corresponding to the width of the block.

The front block 10a is placed with the first and second front seats oriented to face backward against or near a front edge of the circumscribed rectangle and the rear block 10b is placed with the first and second rear seats oriented to face forward against or near a rear edge of said circumscribed rectangle.

The seats of the front block 10a are therefore globally arranged in the set 100 face-to-face with the seats of the rear block 10b.

A central console 30, part of the set 100, partitioning the space is arranged between the front and rear blocks so that occupants of facing seats are screened from their facing neighbour.

The central console 100, oriented in the FIG. 2 plan view with its greatest dimension substantially in the transverse direction, has a length in said transverse direction substantially equal to the width Ly of the circumscribed rectangle.

In the longitudinal direction, the central console 100 is also substantially centrally located in the circumscribed rectangle so as to define spaces of substantially the same size assigned to each of the front and rear blocks.

Each seat is oriented in a direction defined by a longitudinal axis 201a, 211a, 201b, 211b of the seat 20a, 21a, 20b, 21b in question, respectively, and each block is oriented by longitudinal axis 111a, 111b of the block 10a, 10b in question, respectively.

The longitudinal axis of a block is in practice oriented in a mean direction defined by the longitudinal directions of the two seats of the block in question. In FIG. 2, each longitudinal axis of a seat or a block is the material representation of an overall vertical plane of symmetry of said seat or said block in question.

Considering the front block 10a, the longitudinal axis 211a of the first front seat 21a converges with the longitudinal axis 201a of the second front seat 20a toward a point located substantially on the longitudinal axis 111a of said front block and in front of the front seats.

In accordance with a similar arrangement, the longitudinal axis 211b of the first rear seat 21b converges with the longitudinal axis 201b of the second rear seat 20b in the direction of a point located substantially on the longitudinal axis 111b of the rear block 10b and in front of the rear seats.

The longitudinal axis of each seat therefore forms with the longitudinal axis of the block of which it is part a seat/block angle Asb(i), where i is an index of the seat in question.

Moreover, the longitudinal axis 111a, 111b of each of the blocks 10a, 10b, respectively, is not parallel to the lateral edges 102 of the circumscribed rectangle 101 and defines with the direction of said lateral edges a block angle Ab(j), where j is an index of the block in question.

Accordingly, a seat angle As(i), determined by the longitudinal direction of the seat in question and the direction of the lateral edges, is the result of the combination of the seat/block angle Asb(i) of the seat in question with the block angle Ab(j) of the block of which said seat in question is part and, using an oriented system of axes and considering algebraic values of the angles, $As(i)=Asb(i)+Ab(j)$.

Furthermore, each block angle Ab(j) is such that the longitudinal axis of the block of seats in question is pivoted relative to the lateral edges 102 of the circumscribed rectangle to be closer in the direction of the direction of a first diagonal 105 of said circumscribed rectangle.

In the example shown in FIG. 2, said first diagonal corresponds to the diagonal connecting the vertices of the circumscribed rectangle corresponding to corners of said circumscribed rectangle in which the first front seat 21a and the first rear seat 21b are located.

Furthermore, the relative positions of the seats in the set 100 and the signs of the seat angles As(i) of the seats are such that the longitudinal axes 211a, 211b of the first front seat 21a and the first rear seat 21b pass close to the centre of the circumscribed rectangle, i.e. in the area of the central console 30 said longitudinal axes of the seats are a distance apart substantially less than the width of the seat cushions of the seats.

In accordance with this configuration, when the seat angles As(i) of the first front seat 21a and the first rear seat 21b have the same absolute value, as in the embodiments shown in the figures, it results that said two first seats have their longitudinal axes 211a, 211b parallel and close together, with the smallest distance in the FIG. 2 plan view significantly less than the width of a seat.

The first front seat 21a and the first rear seat 21b are consequently substantially aligned in a face-to-face configuration and the second front seat 20a and the second rear seat 20b of the set 100 are consequently located from either side of this alignment of the two first seats.

It may be noted that in the configuration shown in FIG. 2, by virtue of the combination of the seat/block angles Asb(i) and the block angle Ab(j), the directions of the longitudinal axes 201a, 201b of the second front seat 20a and the second rear seat 20b are close to the direction of the lateral edges 102 of the circumscribed rectangle.

In known manner, each seat 20a, 21a, 20b, 21b is convertible between at least two extreme positions: a sitting position, in which a seat back of the seat is raised and substantially vertical, and a recumbent position in which the seat back of the seat is in a lowered position, substantially horizontal and substantially level with a seat cushion of said seat.

Furthermore, a plane to lie down on of a seat in the recumbent position, defined by the seat cushion and the seat back of said seat, is located at a height that may be different, according to the seat in question of the four seats of the set 100 of which it is part, as a function of the position of said seat in question in a block and of the position of the block in the set 100.

The height of a seat cushion or of a plane to lie down on must be considered relative to a reference horizontal plane of a vehicle in which the seat, the block or the set in question is installed. The choice of a reference horizontal plane is arbitrary and for reasons of convenience it will be considered her that said reference horizontal plane corresponds to a plane defined by a floor of the vehicle, for example the floor on which circulate persons having to access the sets 100.

Each seat includes an enveloping shell 203a, 213a, 203b, 213b that conceals mechanical components of the seat providing the movements of conversion between the different positions that the seat can adopt and which, apart from the aesthetic aspects, isolates said mechanical components to prevent objects or persons interfering with said components.

Said shell is moreover sufficiently high and enveloping to create some privacy for a person stretched out when the seat is in the recumbent position, by isolating said person, at least at the level of their head, from other persons behind or to one side of the seat.

Each set includes armrests and the armrests between the first and second seats of a block are advantageously joined to form a separator of the two seats of the block, the shape of said separator, triangular or trapezoidal when seen from above, being adapted to take account of the fact that the axes of the first seat and the second seat are not parallel.

European patent 2 507 131, already cited, describes examples of convertible seats and blocks of two seats having features similar to the seats and blocks of the presently disclosed embodiment.

Figure 4:
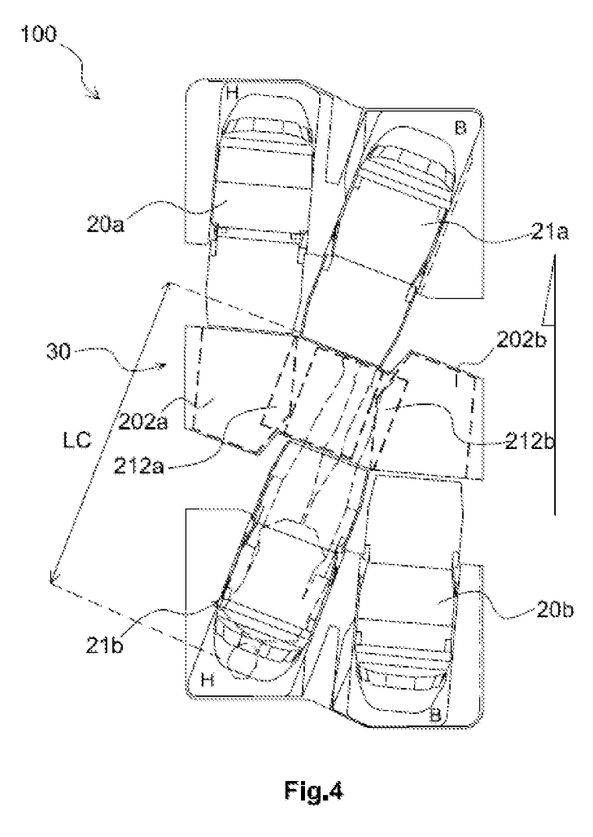
FIG. 4: a simplified plan view showing the four seats of a set of two blocks each of two seats similar to the set shown in FIGS. 2 and 3 and in which are shown the spaces occupied by the feet of passengers in the recumbent position.

Considering FIG. 4, showing a set 100 similar to the set from FIG. 2, in which the seats 20a, 21a, 20b, 21b are shown in the recumbent position and from above and in which the central console 30 is merely suggested, a space dedicated to each seat extends forward of the seat in question inside the central console 30.

The position of a block and the seats relative to the central console 30 and the dimensions in the longitudinal direction of the set 100 are such that the resulting space dedicated to a seat occupies along a length Lc substantially a distance from a rear face of the shell of the seat in question and a face of said central console on an opposite side of said central console relative to a side on which said seat in question is located. In other words, if the central console 30 is considered to include a front face situated toward the front according to the position of the set 100 indicated by the arrow in the drawings and a rear face located toward the rear, then in accordance with the arrangement described above, in the recumbent position a front seat 20a, 21a extends backward substantially as far as the rear face of the central console and a rear seat 20b, 21b extends forward substantially as far as the front face of the central console.

Taking account of the thickness of the walls of the shell of the seat and the central console, the length Lc advantageously corresponds to the length needed to obtain a required recumbent length.

As emerges from FIG. 4, when seen from above, a first front seat 21a and a first rear seat 21b arranged along the first diagonal 105 of the set 100 share the same location of the central console 30 for placing the feet of the occupants of said two first seats.

To allow this configuration without inconveniencing the occupants of the first front seat 21a and the first rear seat 21b, the plane to lie down on of one of said two first seats is offset in height relative to the plane to lie down on of the other first seat and the central console 30 includes partitions defining footwells in which the passengers in said seats may place their feet without inconveniencing one another when they are stretched out.

The footwells associated with the first seats 21a, 21b are therefore superposed in height.

Accordingly, in the example shown in FIG. 4, in its recumbent position, the first front seat 21a of the block 10a is in a low position (identified by the letter B on the drawing of said seat) and the first rear seat 21b of the block 10b is in a high position (identified by the letter H on the drawing of said seat). This choice may be reversed, however, and where appropriate consideration will be taken of the conditions of access to the seats that are a function of how the set 100 is installed in a cabin.

Figure 3A:
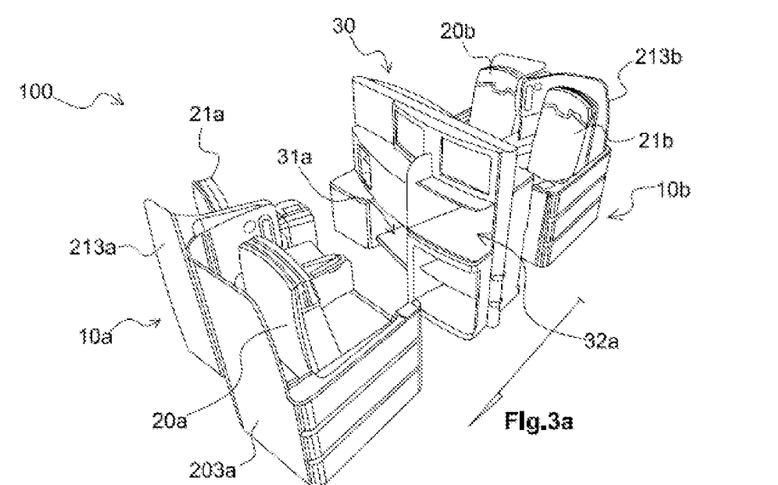
FIGS. 3a and 3b: in perspective view, respectively from the front and from the rear, the set of two blocks each of two seats from FIG. 2.
Figure 3B:
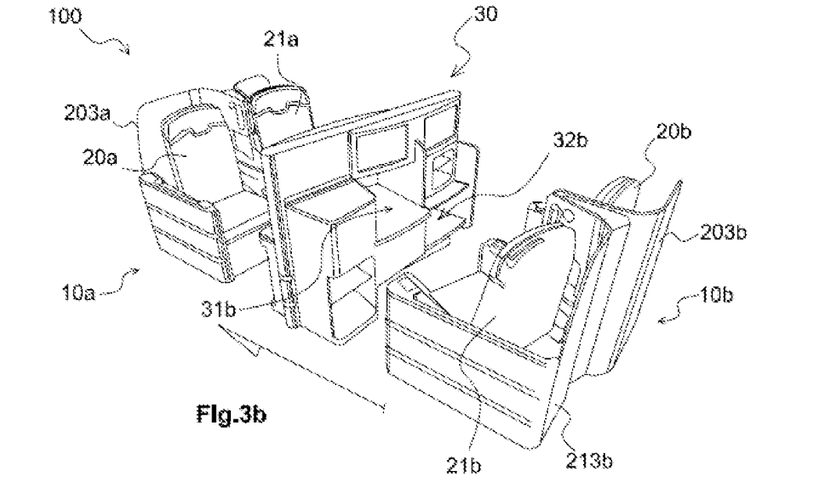

These features will be better understood on considering the FIGS. 3a and 3b perspective views of a set 100.

In these figures, the seats are shown in the sitting position so as to allow the features of the central console 30 to be seen.

The central console 30 constitutes a thick partition between the front face and the rear face of said central console.

As shown in FIGS. 3a and 3b, the front and rear faces are not regular, in particular are not plane, because of the functions and equipment incorporated in said central console, without this feature being limiting on the disclosed embodiment.

Because of the close-together position of the two blocks 10a, 10b of seats of a set 100, which close-together position leads to a distance between the rear of the seats of different blocks less than twice the recumbent length, which is substantially Lc, the central console 30 includes along the longitudinal axis of each seat of the set 100 a footwell 31a, 32a, 31b, 32b corresponding to a hollow space in said central console that is open on at least one side of said hollow space facing the facing seat with which said hollow space is associated.

Moreover, each footwell includes a footrest surface formed by a substantially horizontal lower wall of the hollow space forming the footwell in question, said lower wall being substantially at a height corresponding to the height of the plane to lie down on of the facing seat to which the footwell is attached, so as to form with the seat back and the seat cushion, and where applicable with a leg support of the seat, a continuous and substantially horizontal surface to lie down on.

The footwells 31a, 31b associated with the first seats 21a, 21b, the foot positions of which overlap when seen from above, are superposed in the central console 30 because the planes to lie down on of the seats in question are not located at the same height.

When seen from above the footwells 32a, 32b of the two second seats 20a, 20b are located in the central console 30 close to the lateral extremities from either side of the two superposed footwells.

Because of the convergence of the axes of the seats of a block from the backs of the seats toward a point located short of the foot areas, the width of the central console 30 is mainly linked to the cumulative width of three footwells and this width substantially corresponds to the width of a block of two seats.

It is therefore possible to produce a plane to lie down on the width of which, determined at the level of the seat back to ensure the comfort of an occupant at shoulder level, is substantially constant over substantially all the length of the plane to lie down on, including in the foot area. This results in improved comfort because the occupant is able to turn over on the surface on which they are lying and to move their legs with minimum inconvenience, as the mannequin shown in FIG. 4 demonstrates.

As FIGS. 3a and 3b show, the plane to lie down on of the second seat 20a, 20b of a block is offset in height relative to the plane to lie down on of the first seat 21a, 21b of the same block.

Accordingly, when the first seat has a plane to lie down on offset downwards, identifier B, the second seat next to it has a plane to lie down on offset upwards, identifier H, and vice-versa.

An advantage of this configuration is that the two seats having a low plane to lie down on are on the same lateral edge 101 of the set 100 and the two seats having a high plane to lie down on are on the same opposite lateral edge. If care is taken to arrange the set with a circulation aisle 201 beside the seats with the plane to lie down on offset downwards, this configuration enables easier access to the seats opposite the circulation aisle.

It must however be noted that, subject to management of interference between the footwells, which interference is minimized by the relative orientations of the longitudinal axes of the seats, the offsetting in height of the planes to lie down on of the first and second seats of the same block is not strictly necessary and in one embodiment the set 100 includes two seats of a block with the same recumbent height, B for example, and two seats of the other block, having the same recumbent height or not, but with the recumbent height of at least the first seat different from that of the seats of the facing block, H in the example.

Apart from its primary function in the disclosed embodiment of maintaining footrest surfaces associated with the seats, the central console provides:
  partitioning of the space between the two blocks of seats 10a, 10b up to a required height, advantageously a height such that in the seated position the occupants of the facing seats do not see each other;
  vertical partitioning of the footwells;
  stowage spaces assigned to each seat;
  support for individual screens or other entertainment means assigned to each seat.

In respect of the arrangement of the seats in a set 100, it should be noted that the first seats 21a, 21b close to an alignment along the first diagonal 105 of the circumscribed rectangle 101 have the benefit of a total available length within said circumscribed rectangle greater than the length Lx of a lateral edge of said circumscribed rectangle. The length Lx of a lateral edge is in practice determined by the two second seats 20a, 20b the longitudinal axes of which are much less inclined relative to the longitudinal axis X of the set 100 and by the necessity to maintain between the central console 30 and the seats when in the sitting position a minimum width over a necessary distance for reasons of comfort and access.

Accordingly, as can be seen in FIGS. 2 and 4, a rear face of the shell 213a, 213b of one of the first seats 21a, 21b does not need to be located against the front edge 103 or the rear edge 104, depending on the seat in question, of the circumscribed rectangle 101, as are the rear faces of the shells 203a, 203b of the second seats 20a, 20b that in practice determine the position of said front and rear edges.

A result of this configuration is that a front or rear end of the set 100 does not strictly follow the front edge 103 or the rear edge 104 of the circumscribed rectangle 101 but forms an S-shaped curve in which the rear faces of two shells of the same block are offset in the longitudinal direction X, a rear face of a shell of a first seat 21a, 21b being offset toward the inside of the circumscribed rectangle 100 by a distance DLx.

Figure 5:
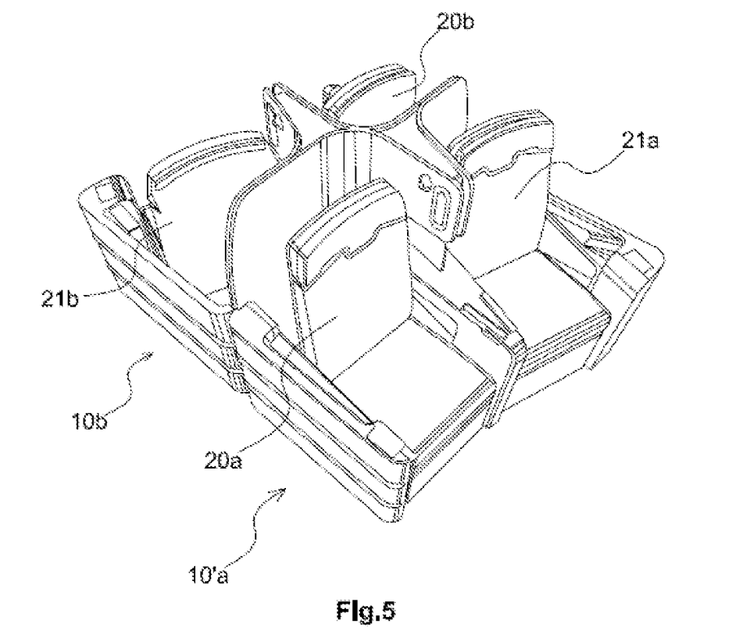
FIG. 5: in perspective view an arrangement of two blocks each of two seats placed back-to-back, showing blocks of two seats of sets conforming to the sets shown in FIGS. 1 to 5 juxtaposed longitudinally.

Furthermore, because of the radial symmetry of the resulting shape in plan of the set 100, as shown in FIG. 5, two or more similar sets 100 can be contiguously juxtaposed along the longitudinal direction X to form a line 200.

This configuration also results in the possibility of producing arrangements of two blocks 10b, 10'a of seats back-to-back, said two blocks being intended for two different successive sets 100, 100', for example with the aim of optimizing ancillaries useful to the functioning of the seats and the connections to power supplies or channels of communication with the vehicle in a cabin of which the seats are installed.

Figure 6:
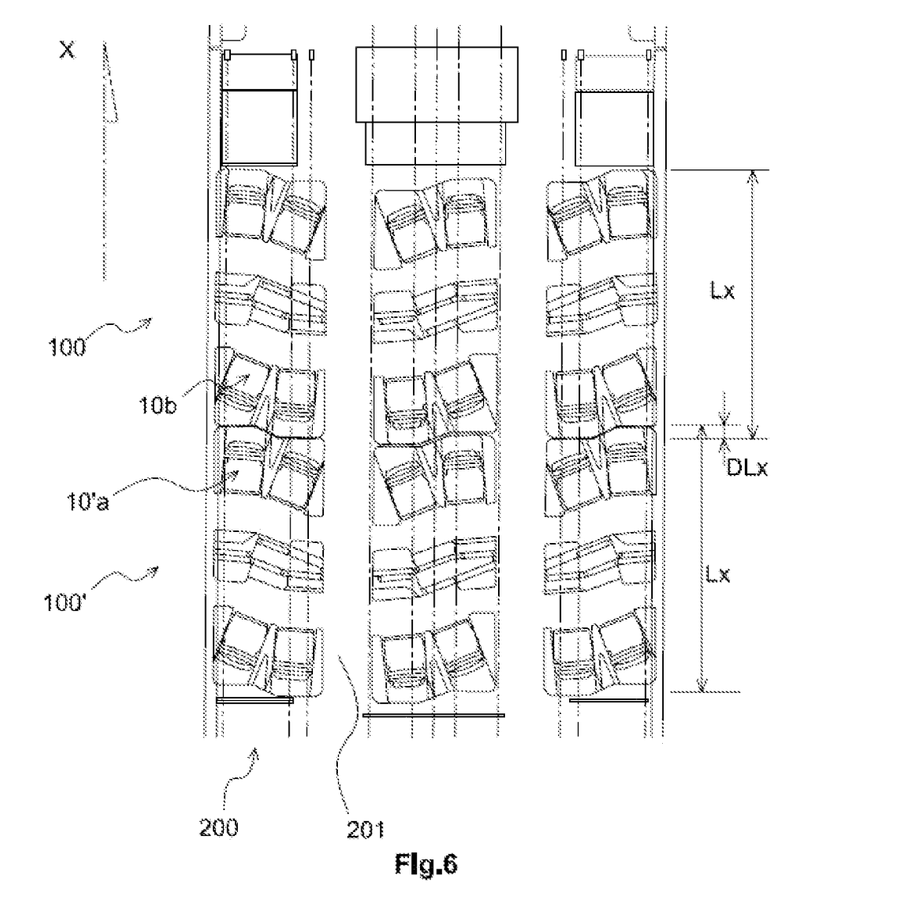
FIG. 6: an example of the layout of an aircraft cabin portion with sets of two blocks each of two seats in accordance with the disclosed embodiment.

As the aircraft cabin arrangement shown in FIG. 6 demonstrates, a saving of DLx on the length Lx is further obtained for each juxtaposed set 100, 100' in an arrangement of two or more contiguous sets.

For example, for three juxtaposed sets, the total resulting length in the longitudinal direction X is only 3*Lx−2*DLx.

Here this saving in terms of the cabin length needed is cumulative with the saving resulting from overlapping the foot areas of the seats.

In this embodiment, the two blocks 10a, 10b each of two seats of a set 100 and the central console 30 of the same set are retained in their required relative positions by being fixed to a floor of the vehicle.

The fixings are at particular locations, for example, or chosen on rails integrated into the floor, as is most usual in aircraft.

The disclosed embodiment therefore makes it possible to provide seats that are very comfortable in a recumbent configuration with a cabin length needed per seat substantially less than the recumbent length and less than in the known solutions.

The privacy of each seat's occupant is preserved both with respect to a laterally adjacent seat and a facing seat.

The disclosed embodiment also makes it possible to dissociate the seat part proper from the central console part and therefore to dissociate the elements relating to the mechanics of the seat and management of its conversion between the different configurations, sitting and recumbent or other intermediate positions, from those relating to passenger entertainment.

Because of this, subject to minor modifications, for example the length of a leg rest, it is equally possible, with given blocks and central consoles, to arrange sets with different recumbent lengths.

The aspects of the disclosed embodiment make it possible to arrange passenger cabins, in particular aircraft cabins, with a number of seats greater than that of an arrangement with the known seats for a given recumbent length and a given cabin, or to reduce the cabin length for a given number of seats and a given recumbent length.

The invention claimed is:

1. A set of four seats, comprising: a front block, comprising a first front seat and a second front seat, arranged side-by-side, and a rear block comprising a first rear seat and a second rear seat arranged side-by-side, wherein each seat is convertible individually between a sitting configuration and a recumbent configuration, wherein a plane to lie down on is formed, in which set:
   the front and rear blocks are arranged in a plan view inside a circumscribed rectangle of said set, lateral edges of said rectangle, having a length of Lx of the set, being oriented parallel to a longitudinal direction X of the set, a front edge and a rear edge, of said rectangle having a length Ly, corresponding to a width of said front and rear blocks, wherein:
   the front block is placed at the front edge of the rectangle;
   the rear block is placed at the rear edge of the rectangle;
   the front seats are globally arranged to be face-to-face with the rear seats, the first front seat and the first rear seat being arranged in the set along a first diagonal of the circumscribed rectangle;
   wherein, longitudinal axes of the said first front seat and first rear seat are arranged in a direction of said first diagonal so that the longitudinal axes of the said first front seat and first rear seat are oriented such as to have the first front seat and the first rear seat substantially aligned face-to-face along the first diagonal;
   a distance between the first front seat and the first rear seat is such that a foot area of said first front seat is superposed when seen from above with a foot area of said first rear seat, where a foot area corresponds to a location for the feet of an occupant of the corresponding seat when in the recumbent configuration; and
   when the first front seat and the first rear seat are both in the recumbent configuration, the planes to lie down on of said first front seat and first rear seat are at different heights relative to a reference level.

2. The set according to claim 1, wherein the length Ly of the front edge and of the rear edge, corresponding to the width of the circumscribed rectangle, is determined by the side-by-side assembly of the two seats of a block, the side by side assembly of the two seats of the block including cumulative widths of seat cushions and armrests of the two seats, and
   wherein the second front seat and the second rear seat are arranged in said set along a second diagonal and with a longitudinal axis of each of said second front and rear seats oriented so that a foot area of each of said second front and rear seats is located inside the circumscribed rectangle.

3. The set according to claim 2, wherein the foot areas correspond to footwells for each of the four seats arranged in a central console between the front and rear blocks, and wherein the footwells of the second front and rear seats are juxtaposed from either side of the superposed footwells of the first front and rear seats.

4. The set according to claim 3, wherein the central console forms a visual separation between the two blocks incorporating individual comfort or entertainment features for the attention of each of the occupants of the seats.

5. The set according to claim 1, wherein each seat is enclosed in a shell, a rear face of the shell of the second front seat is substantially against the front edge of the circumscribed rectangle, a rear face of the shell of the second rear seat is substantially against the rear edge of said circumscribed rectangle, a rear face of the shell of each of the first front and rear seats being offset a distance DLx toward the interior of the circumscribed rectangle relative to the front or rear edges, respectively, of said circumscribed rectangle.

6. The set according to claim 1, wherein the plane to lie down on of at least one of the second front or rear seats is offset in height relative to the plane to lie down on of the first seat next to said second front or rear seat in question in the block including said at least one of the second seats.

7. The set according to claim 6, wherein the plane to lie down on of each of the second front and rear seats is offset in height relative to the plane to lie down on of the first front or rear seat next to said second front or rear seat in question in the same block, so that the planes to lie down on of a front seat and rear seat of the set located beside a same lateral edge of the circumscribed rectangle are offset in height in the same upward or downward direction relative to the planes to lie down on of the two other front seat and rear seat of the set located beside the other lateral edge of said circumscribed rectangle.

8. A cabin or cabin portion for a passenger vehicle including at least one line of at least two sets according to claim 1, juxtaposed along the longitudinal direction X parallel to the longitudinal direction X of the at least two sets, in which line a rear face of a rear block of a first set is against a rear face of a front block of a second set juxtaposed to said first set behind said first set.

9. The cabin or cabin portion according to claim 8, wherein, for each set, each seat is enclosed in a shell, a rear face of the shell of the second front seat is substantially against the front edge of the circumscribed rectangle, a rear face of the shell of the second rear seat is substantially against the rear edge of said circumscribed rectangle, a rear face of the shell of each of the first front and rear seats being offset a distance DLx toward the interior of the circumscribed rectangle, relative to the front or rear edges, respectively, of said circumscribed rectangle such to form an S-shape of a front edge and a rear edge of the set, wherein circumscribed rectangles of the at least two juxtaposed sets overlap partially by the length DLx so that N (N>2) juxtaposed sets of length Lx occupy along the longitudinal direction X a total length of (N*Lx)−((N−1)*DLx).

10. The cabin or cabin portion according to claim 8, wherein the first front seat and the second rear seat of each set, located beside the same lateral edge of the circumscribed rectangle respective of the set, and offset downward relative to the second front seat and the first rear seat of the set in question located beside the other lateral edge of said circumscribed rectangle, are flanked by a circulation aisle of said cabin or cabin portion.

11. The cabin or cabin portion according to claim 8, wherein a set of the at least two seats includes the front block of two seats, the rear block of two seats and a central console, said front block, said rear block and said central console being fixed at predetermined separation distances independently of each other to a floor of said cabin or cabin portion by fixing points arranged in said floor.

12. The cabin or cabin portion according to claim 8, wherein the rear block of a first set placed back-to-back against the front block of a second set juxtaposed to said first set behind said first set shares ancillaries useful to the functioning of the seats of said blocks.

13. An aircraft including a cabin or cabin portion conforming to claim 8.

* * * * *